United States Patent
Vatterott et al.

(10) Patent No.: US 6,691,607 B2
(45) Date of Patent: Feb. 17, 2004

(54) HIGH AND LOW TEMPERATURE GAS ACTUATED CYLINDER

(75) Inventors: Oskar F. Vatterott, deceased, late of Franlin, MO (US), by Gladys Vatterott, executrix; Bryan Vatterott, Franklin, MO (US)

(73) Assignee: Progressive Pneumatics LLC, St. Louis, MO (US)

( * ) Notice: Subject to any disclaimer, the term of this patent is extended or adjusted under 35 U.S.C. 154(b) by 95 days.

(21) Appl. No.: 09/997,712

(22) Filed: Nov. 30, 2001

(65) Prior Publication Data

US 2002/0100363 A1 Aug. 1, 2002

Related U.S. Application Data

(60) Provisional application No. 60/250,751, filed on Dec. 2, 2000.

(51) Int. Cl.$^7$ ................................................. F01B 31/00
(52) U.S. Cl. ........................................................ 92/240
(58) Field of Search .............................. 92/181 R, 184, 92/240–245; 277/9, 27

(56) References Cited

U.S. PATENT DOCUMENTS

| | | | |
|---|---|---|---|
| 2,907,304 | A | 10/1959 | Macks |
| 3,137,439 | A | 6/1964 | Hanny et al. |
| 3,150,570 | A | 9/1964 | Johson et al. |
| 3,150,571 | A | 9/1964 | Frassetto et al. |
| 3,303,990 | A | 2/1967 | Curwen |
| 3,777,722 | A | 12/1973 | Lenger |
| 4,644,851 | A | 2/1987 | Young |
| 4,846,051 | A | 7/1989 | Wade et al. |
| 4,932,313 | A | 6/1990 | Gutknecht |
| 5,015,000 | A | * 5/1991 | Perini ....................... 92/165 R |
| 5,218,896 | A | 6/1993 | Furukawa |
| 6,415,706 | B1 | * 7/2002 | Poschl et al. ................. 92/248 |

FOREIGN PATENT DOCUMENTS

GB 2180915 8/1986

OTHER PUBLICATIONS

Garland Manufacturing Company; GAR–DUR® UHMW Technical Data Sheet.
Garland Manufacturing Company; manufacturing information from website.

* cited by examiner

*Primary Examiner*—Edward K. Look
*Assistant Examiner*—Igor Kershteyn
(74) *Attorney, Agent, or Firm*—Polster, Lieder, Woodruff & Lucchesi

(57) ABSTRACT

A gas cylinder of the present invention comprises a housing having a tube, a front head and an rear end cap defining a chamber. A pair of ports are provided to allow for the input and exhaust of gas in the chamber. A piston is received in the chamber for axial movement within the chamber and separates the chamber into two cavities. A rod is operatively connected to the piston and extends forwardly from the piston, through a bore in the front head to exit the chamber through the front head. The rod is loosely or floatingly connected to the piston, to be movable relative the piston by a plate at an end of the rod which is trapped in a bore in a forward end of the piston. A piston seal is received in a groove in the piston to form a seal between the piston and the cylinder tube. The piston is flexible and changes shape due to pressure changes within the chamber. A rod seal is also provided between the rod and the front head bore. The rod seal is radially expandable and contractible in response to changes in gas pressure about the rod seal. The sizes of the piston and the cylinder tube, in conjunction with the piston seals allows for the formation of a cushion of gas around at least a portion of the piston; and the piston floats on the gas cushion to facilitate the low friction movement of the piston in the tube without the use of a lubricant.

44 Claims, 8 Drawing Sheets

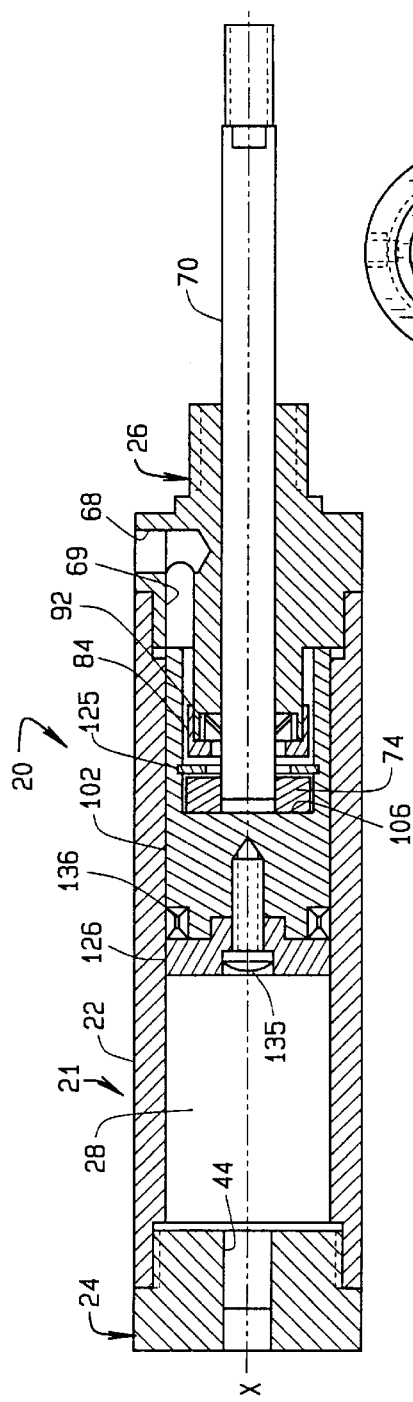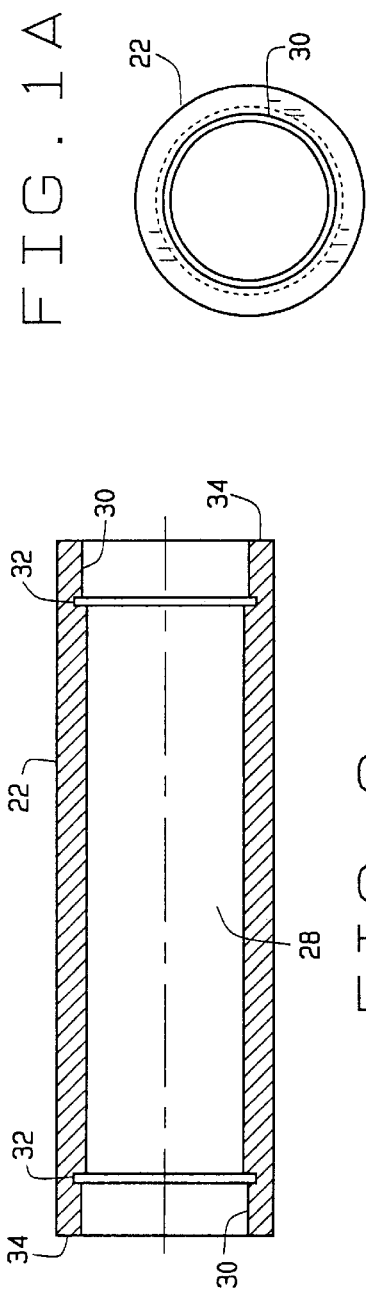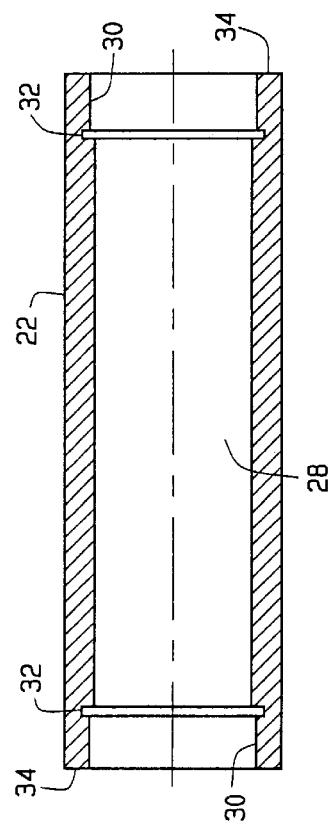

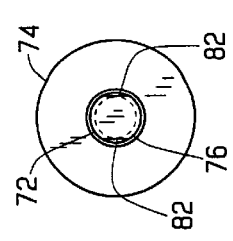
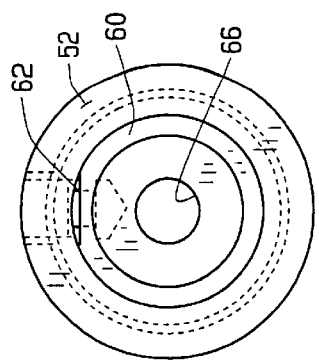
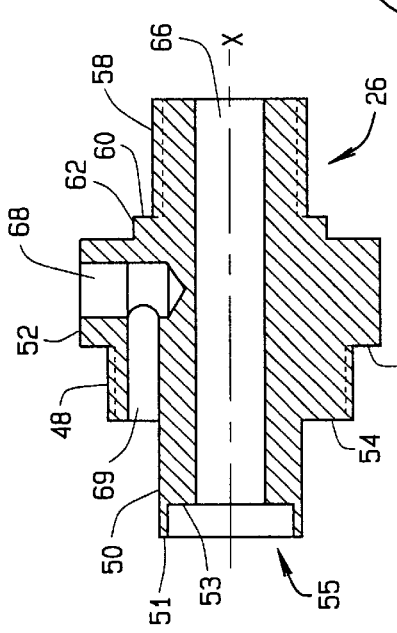
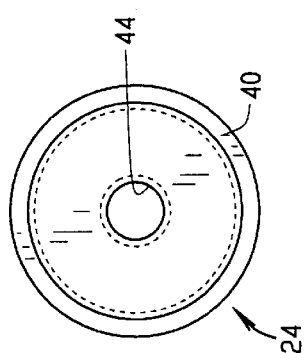
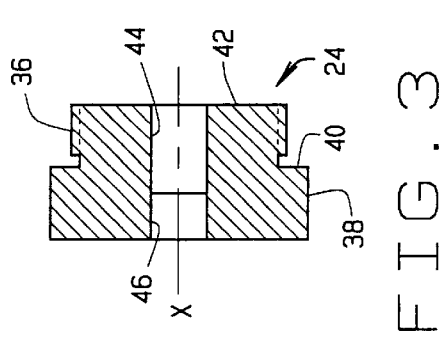
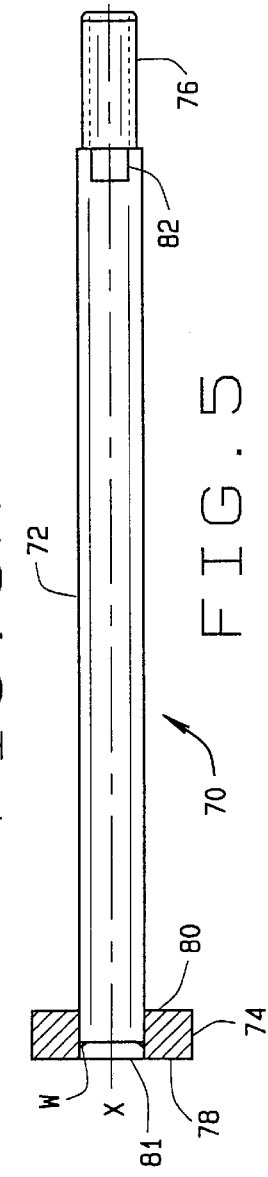

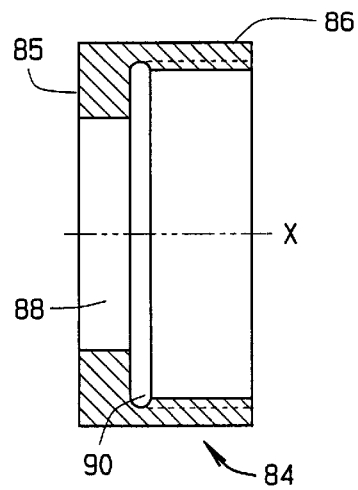
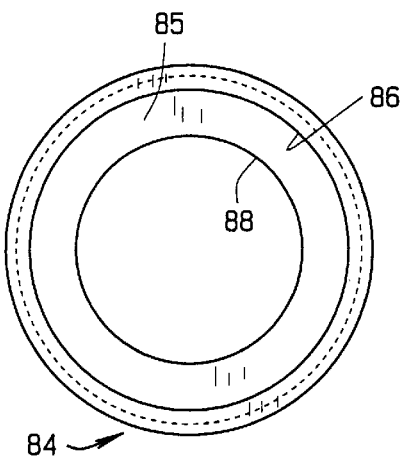
FIG. 6   FIG. 6A
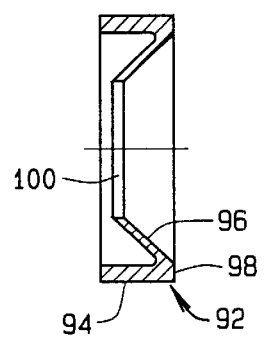
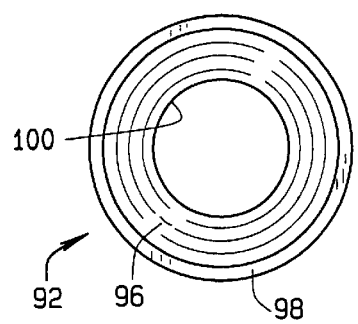
FIG. 7   FIG. 7A
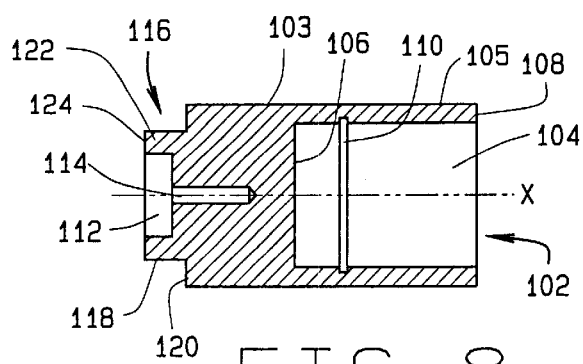
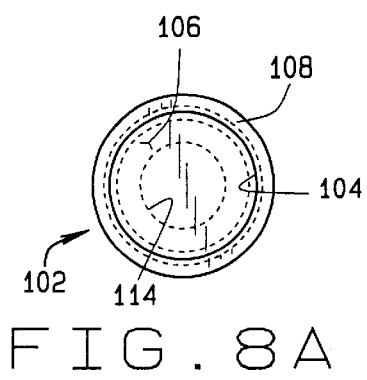
FIG. 8   FIG. 8A

HIGH AND LOW TEMPERATURE GAS ACTUATED CYLINDER

CROSS REFERENCE TO RELATED APPLICATIONS

This application claims priority to provisional application. Ser. No. 60/250,751 filed Dec. 2, 2000, entitled "High and Low Temperature Gas Actuated Cylinder", and which is incorporated herein by reference.

STATEMENT REGARDING FEDERALLY SPONSORED RESEARCH OR DEVELOPMENT

Not Applicable.

BACKGROUND OF THE INVENTION

This invention relates in general to air pressure cylinders, and more particularly, to air pressure cylinders capable of operation at a broad range of atmospheric/environmental conditions, including extremely high and low temperatures.

In its most basic form, an air pressure cylinder consists of a piston, situated within a cylinder, which is connected to a push rod that exits one end of the cylinder. Ports at each end of the cylinder allow for the flow of pressurized air into the cylinder. When pressurized air is forced into a first end of the cylinder, the pressure in the cylinder forces the piston toward the second end, thereby actuating the push rod. Likewise, when air is forced into the second end of the cylinder, the air pressure forces the piston toward the first end. The push rod moves in synchronization with the piston, and it is the movement of the push rod that is harnessed for mechanical actuation purposes.

The movement of the piston against the cylinder walls creates friction. This friction escalates during continuous use and under conditions of humidity and particulate invasion. In addition, typical air cylinders are composed of metals. When these cylinders are subjected to temperature gradients, each component exhibits a complex set of thermal expansion coefficient characteristics that cause inconsistent expansion in the cylinder. These expansion inconsistencies greatly increase the friction generated in the air cylinder during operation. The friction generated in the cylinder causes wear that leads to degradation and failure. Furthermore, the cylinders can bind or lock-up during extreme temperature operation. These limitations are only exacerbated by the need in virtually all gas cylinders for some form of lubrication. When gas cylinders are used in environments with corrosive chemicals or abrasives, not only do the cylinder components degrade in a very short period of time, the lubrication will typically be compromised or destroyed rapidly by contaminants.

Air cylinders are typically classified according to the distance of piston travel. That is, if the piston in an air cylinder will have a maximum travel in one direction of 2.00 inches, the cylinder will commonly be called a "two inch" cylinder. A complete cycle of operation, in which the piston first travels completely in one direction and then in the opposite direction is considered the "stroke" of the cylinder. Hence, a "two inch" cylinder will have a four inch stroke. Because of this, the life of a cylinder is usually measured by the total amount of piston travel. For example, testing may show that a given two inch cylinder may operate for 500,000 strokes, on average, before failing. This equates to an expected life of 2,000,000 inches (i.e. 4 inches/stroke×500,000 strokes).

The anticipated life for typical lubricated air cylinders range from approximately 3,000,000" to 4,000,000", under a moderate temperature and humidity range (i.e. 20° C. to 30° C.; at room humidity) and little or no exposure to particulate or chemical contamination. The life of typical air cylinders degrades rapidly when exposed to more extreme conditions. In fact, because of these limitations, many typical gas cylinders are designed specifically for a single, disposable use.

In many applications, it is desirable for air cylinders to operate for a much longer life. For example, a one inch air cylinder for a push punch along a non-stop assembly line may operate continuously at a rate of 100 strokes per minute. Over the period of one month, the number of strokes for that cylinder will exceed 4,000,000, or 8,000,000 inches. This means that, on average, the cylinder will need to be replaced at least twice each month to keep the assembly line operating. In addition, many applications impart more demanding conditions on the air cylinders with the same desire for long life. For example, a machine to test automobile door handles may require for each test that the test handles open and close hundreds of thousands of times in conditions that include temperature ranges between lower than −70° C. and greater than 110° C., with humidity up to 100% and controlled particulate injections. In such circumstances, cylinder failures not only cause downtime, but can disrupt or ruin ongoing testing. Some cylinders in use in testing facilities need to be replaced on a weekly basis.

Typical air cylinders are also limited in use because they are generally susceptible to a wide variety of chemical attacks. While typical cylinders can be coated or encased in chemically inert materials, and the lubricants and seals can be specially formulated to withstand specific chemicals, these measures are costly and imperfect. They impart inefficiencies in the cylinder, such as additional friction and wear at the seals, that reduce the cylinder life. Similarly, the lubricants in typical air cylinders create the potential risk of contamination in sterile or clean environment applications, such as in food handling or pharmaceutical production. To rectify this problem, a number of concepts have been adopted. For example, special lubricants have been developed for use in certain applications, and cylinders have been developed that operate without lubrication. However, each of these are also costly and imperfect. The special lubricants are more expensive, limited in application, and less effective than normal lubricants, which shortens the life of the air cylinders. The non-lubricated cylinders are more expensive and exhibit a shorter life than lubricated versions.

Finally, typical gas cylinders suffer from a problem commonly known as "bottoming out." That is, when the piston is allowed to travel the full distance of the stroke under pressure, the piston will violently 'strike the end of the inner cavity of the cylinder. Because the pistons and housings of typical gas cylinders are made of metals, this impact causes permanent distortions in the piston that can drastically shorten cylinder life or cause a catastrophic failure. Typically, users must "oversize" their gas cylinder purchases to accommodate this problem. That is, if an application requires a 1.5 inch stroke gas cylinder, the user must purchase, for example, a 1.75 inch stroke cylinder and arrange the cylinder such that the required 1.5 inch stroke occurs in the middle of the cylinder's 1.75 inch stroke range. This, of course, is inefficient and costly. Furthermore, any miscalculations will lead to early cylinder failures. While some typical gas cylinders incorporate cushions to soften the impact, this measure is not wholly effective and adds further cost to the cylinder.

Of course, down time in any application is undesirable. However, downtime in production is particularly expensive, since it includes maintenance and parts costs, idle time for workers, reduction in output, and increased pro rata overhead costs. Accordingly, any measure that increases the life of air cylinders without unreasonably increasing the cost of the cylinder is highly desirable.

BRIEF SUMMARY OF THE INVENTION

Briefly stated, a gas cylinder of the present invention comprises a housing defining a cylindrical chamber, a piston within the housing chamber that separates the chamber into two cavities, a rod operatively connected to the piston and which extends from the piston externally of the housing; and one or more gas ports in the housing to allow the input and exhaust of gas in the cylindrical chamber. The addition of sufficient gas, through one or more of the ports, into one of the two cavities of the housing facilitates movement of the piston. Cushions of gas are formed about the piston and the rod, and the piston and rod float in these respective gas cushions, to enable the low friction movement of the piston and the rod within the cylinder housing. Hence, the cylinder can be operated without the use of a lubricant.

A piston seal is positioned about the piston. The piston seal is sized and shaped to facilitate the proper flow of gas over the piston to form the gas cushion around the piston. In one embodiment, the piston seal is generally X-shaped in cross-section. It is made from a material which is sufficiently elastic to enable the piston seal to radially expand and contract in response to changes in gas pressure in one or both chambers, thereby regulating and maintaining desired gas flow and pressure about the cylindrical walls of the piston. A radial groove about the piston holds the piston seal, and a piston seal retainer holds the piston seal in the radial groove.

In another embodiment, the piston seal comprises a pair of sealing discs spaced apart by a spacer. This seal is received in a groove having sloped side walls, to define a generally trapezoidal gap. The spacer also is trapezoidal in shape, but has a height less then the annular gap between the base of the groove and the cylinder tube, forming a gap between the outer surface of the spacer and the cylinder tube. The sealing discs slope toward each other. That is, the forward sealing disc slopes rearwardly and the rear sealing disc slopes forwardly. The groove walls, the sealing discs, and the sloped sides of the spacer all form angles with a diameter of the cylinder. The angle defined by the spacer walls is greater than the angle defined by the sealing discs; and the angle defined by the sealing discs is greater than the angle defined by the groove walls. The sealing discs seal against the cylinder tube inner wall. When air enters the cylinder, for example from a rear port, the initial blast of air flexes the rear sealing disc forwardly to "unlock" the seal between the sealing disc and the tube. The air the urges the forward sealing disc to into a sealing engagement with the cylinder tube.

A rod seal is also preferably positioned about the rod. The rod seal is sized, shaped, and dimensioned to facilitate the proper flow of gas about the rod sufficient to form the gas cushion about the rod to float the rod. The rod seal is elastic. In one embodiment, the rod seal is generally V—or V-shaped, and has a back leg or outer portion and has a flexible lip that extends from the outer portion of the seal radially inwardly toward the rod in a non-perpendicular manner. In a second embodiment, the seal is somewhat "K"-shaped, with the back leg of the "K" being angled. In both embodiments, the seal readily allows the flow of gas in one direction, but gas flow in the opposite direction flexes the seal to seal against the rod and resist the flow of gas in that opposite direction. The rod seal can be held in place about the rod by a radial groove in the housing or by a retainer in proximity with the housing about the rod. A retaining ring can also be used to hold the seal in place.

A disc at one end of the rod nearest the piston, having a radial dimension somewhat greater than the radius of the rod is loosely constrained in a well in the piston, thereby facilitating the general synchronous movement of the rod and the piston while allowing both to independently float on gases in the cylinder.

In addition, because the housing and piston components are all made of an elastic material, the present invention is able to withstand full pressure, full-stroke impacts without suffering significant loss of cylinder life.

In one embodiment, the cylinder tube, end caps, piston, and piston and rod seals are uniformly composed of a high density plastic, having a molecular weight greater than 500,000 and a coefficient of sliding friction lower than 2.0. These material properties, in conjunction with the novel design disclosed herein, enable the gas cylinder apparatus to operate for extended periods of time over a broad range of temperatures, at least including all temperatures between −60° C. to 110° C., with exposure to numerous corrosive and abrasive contaminants, and without lubrication. In another embodiment, the end caps are made from a metal, such as aluminum or stainless steel, while the remaining noted components (i.e., the cylinder tube, the piston, and piston and rod seals) are made from the high density plastic.

BRIEF DESCRIPTION OF THE SEVERAL VIEWS OF THE DRAWINGS

FIG. 1 is a longitudinal cross-sectional view of a first illustrative embodiment of a gas cylinder of the present invention;

FIG. 1A is an end view of the cylinder in FIG. 1;

FIG. 2 is a longitudinal cross-sectional view of a tube of the cylinder of FIG. 1;

FIG. 2A is an end view of the tube;

FIG. 3 is a longitudinal cross-sectional view of a rear end cap of the cylinder of FIG. 1;

FIG. 3A is an end view of the rear end cap in FIG. 3;

FIG. 4 is a longitudinal cross-sectional view of a front head of the cylinder of FIG. 1;

FIG. 4A is an end view of the front head;

FIG. 5 is a longitudinal cross-sectional view of a piston rod of the cylinder adapted to be floatingly connected to a piston of the cylinder;

FIG. 5A is an end view of the piston rod in FIG. 5;

FIG. 6 is a longitudinal cross-sectional view of a rod seal retainer for the cylinder of FIG. 1;

FIG. 6A is an end view of the rod seal retainer in FIG. 6;

FIG. 7 is a longitudinal cross-sectional view of a rod seal for cylinder of FIG. 1;

FIG. 7A is an end view of the rod seal in FIG. 7;

FIG. 8 is a longitudinal cross-sectional view of the piston of the cylinder of FIG. 1;

FIG. 8A is an end view of the piston in FIG. 8;

Corresponding reference characters indicate corresponding parts throughout the several views of the drawings.

DETAILED DESCRIPTION OF INVENTION

Figure 9:
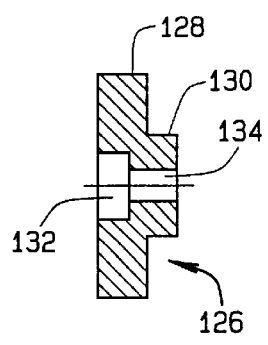
FIG. 9 is a longitudinal cross-sectional view of the piston seal retainer of the cylinder of FIG. 1.
Figure 9A:
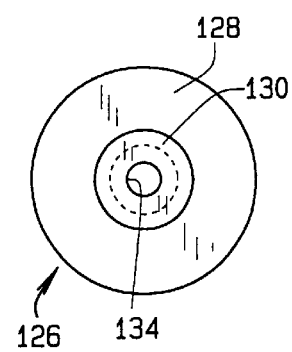
FIG. 9A is an end view of the piston seal retainer in FIG. 9.

A first illustrative embodiment of a novel high and low temperature gas actuated cylinder is indicated generally at 20 (FIG. 1). The gas cylinder 20 includes a housing 21 having a hollow, tube 22, a rear head or end cap 24 at one end of the tube and a front head or end cap 26 at the other end the tube. The tube 22 and both end caps 24 and 26 are concentric about an axis X. The tube 22 is hollow (FIG. 2), defining a cavity 28 formed through its full length that is concentric about the axis X. At each end of the housing 22, threaded inner surfaces 30 extend a short distance into the cavity 28. A thin groove 32 between the threaded and unthreaded surfaces of the cavity 28 facilitates the manufacturing process, although the groove 32 may be readily adapted or modified to accept a seal such as a gasket or O-ring, for example. Each end of the housing 22 has a flat end face 34.

The rear end cap 24 (FIG. 3) has a threaded stem 36 at one end and a cap 38 at the other end. The cap 38 and stem 36 are cylindrical and concentric about the axis X. The cap 38 is wider than the stem 36, and a flat lip or shoulder 40, perpendicular to the axis X, is formed at the junction between the stem 36 and the cap 38. At the end of the stem 36, a flat face 42 is formed perpendicular to the axis X. The threaded stem 36 is sized to be received in one end of the tube 22, and the threads on the stem 36 match the threaded surfaces 30 inside each end of the tube 22. Hence, the rear end cap 24 is readily screwed into either end of the housing 22. The stem 36 is somewhat shorter than the length of the threaded surfaces 30, such that when the stem 36 is fully engaged in one of the surfaces 30, the lip 40 abuts and can be tightened against that end face 34. A through bore 44 extends through the entire length of the rear end cap 24. An end portion 46 of the through bore 44 opposite the face 42 is threaded to accommodate connection to a nipple, gas line or other fitting.

The front head or end cap 26 (FIG. 4) has a threaded mid-section 48 with an inner stem 50 extending from one side of the mid-section 48. A flat lip 51 extends perpendicularly from a distal surface 53 of the inner stem 50 to define a cup; 55 at the back of the inner stem 50. The outer surface of the lip 51 is threaded. A ring 52 is formed around the mid-section 48 at an end opposite of the inner stem 50. The mid-section 48, the inner stem 50 and the wide ring 52 are all cylindrical and concentric about the axis X. However, the mid-section 48 is wider than the inner stem 50, and the wide ring 52 is wider than the mid-section 48. Shoulders 54 and 56, both perpendicular to the axis X, are thereby formed between the inner stem 50 and the mid-section 48 and between the wide ring 52 and the mid-section 48, respectively. The threaded mid-section has a diameter sized to be received in the tube 22, and the threads of the mid-section 48 match the threaded surfaces 30 inside each end of the housing 22, to enable the front head 26 to be screwed into either end of the tube 22. The mid-section 48 is somewhat shorter than the length of the threaded surfaces 30, such that when the mid-section 48 is fully engaged in one of the surfaces 30, the lip 56 abuts and can be tightened against the end face 34 of the housing 22.

An outer cylindrical stem 58 extends forwardly from the ring 52. The outer surface of the stem 58 is threaded for attachment of the cylinder 20 to a fitting, a machine or other device. A shoulder 60 is formed at the juncture between the ring 52 and the stem 58. The shoulder 60 is generally cylindrical with two parallel flats 62 on opposite sides of the shoulder 60 that enable the ready assembly or disassembly of the front head 26 in the housing 22 using a tool such as a wrench or pliers. A through bore 66 of generally constant diameter extends through the front head 26 and enters the cup 55. Both the cup 55 and the through bore 66 are coaxial with the axis X.

A port 68 is formed in the outer, circumferential, surface of the ring 52. The port 68 extends generally radially into the ring 52. An axial passage 69 extends rearwardly from the inner end of the port through the ring 52 and mid-section 48, and opens along the surface of the shoulder 54. As can be appreciated, when the head 26 is mounted on the tube 22, the passage 69 opens into the tube cavity 28. Hence, the port 68, which is connectable to a source of gas, is in fluid communication with the tube cavity 28.

A piston rod 70 (FIGS. 1 and 5) is received in the tube 22 and extends through the bore 66 of the front head 26. The rod 70 has a diameter less than the diameter of the bore 66 so that the piston rod 70 can slide along the length of the through bore 66 without contacting the surfaces of the bore 66. The piston rod 70 (FIG. 5) comprises a single straight shaft 72 having a flat, cylindrical disc 74 at a back end of the shaft and a threaded front end 76. The disc 74 has two flat faces 78 and 80 and a bore 81 sized to receive the shaft 72. The disc faces 78 and 80 are parallel to one another and perpendicular to the axis X. The back end of the shaft 72 is received in the bore 81, and is spaced forwardly of the disc face 78. Preferably, the disc 74 is soldered to the rod 72 and the offset allows for a weld bead W which does not protrude beyond the face 78 of the disc 74. The threaded portion 76 accommodates connection of the piston rod 70 to a fitting, a machine or other device. A pair of parallel flats 82 at the proximal end of the threaded portion 76 to enable the ready use of a tool such as a wrench or pair of pliers on the piston rod 70.

A cylindrical rod seal retainer 84 (FIGS. 1 and 6) fits over the inner stem 50 of the front head 26. The retainer 84 has an end wall 85 and an internally threaded wall 86 extending forwardly from the end wall 85. An end bore 88 is formed in the center of the end wall 85 to be concentric with the wall 86. A thin groove 90 at the junction of the wall 86 and the end surface 85 facilitates the manufacturing process, although the groove 90 may be readily adapted or modified to accept a seal such as a gasket or O-ring, for example. The wall 86 has an inner diameter sized to be received about the inner stem 50 of the front head 26; and threads of the wall 86 match the threaded portion of the front head inner stem 50 so that the rod seal retainer 84 can be screwed onto the front head 26. The depth of the wall 86 is somewhat less than the length of the threaded portion of the inner stem 50. Hence, when the rod seal retainer 84 is fully engaged on the stem 50, the lip 51 abuts and can be tightened against the inner surface of the end surface 85. The end bore 88 is positioned to be aligned with the front head bore 66, and has a diameter larger than that of the rod shaft 72 to allow the shaft to pass freely through the retainer 84.

The diameter of the end bore 88 is somewhat greater than the diameter of the through bore 66 in the front head 26, and that difference in diameters is great enough to preclude any contact between the piston rod 70 and the end bore 88 during operation of the cylinder 20 when the front head 26, the piston rod 70, and the rod seal retainer 84 are all properly assembled.

A rod seal 92 (FIGS. 1 and 7) is received in the cup 55 of the front head 26 to surround the piston rod 70. When assembled onto the stem 50, the rod seal retainer 84 contains the rod seal 92 in the cup 55. In cross-section, the rod seal 92 is generally "V" or "v" shaped. It has an outer, cylindrical ring 94 and an elastic, inner annular lip 96 that extends diagonally from a back edge 98 of the outer ring 94 toward the center of the rod seal 92. In this particular configuration, the cross-sectional angle between the lip and the outer ring is approximately 45°. Of course, this angle may vary for differing gas cylinder applications. When the rod seal 92 is properly positioned in the cup 55, the edge 98 will seal against the back surface 53 in the cup 55 of the front head 26, with the lip 96 facing rearwardly toward the seal retainer 84. Because the lip 96 only extends part of the way into the center of the rod seal 92, a circular opening 100 is formed in the center of the rod seal 92 through which the piston rod shaft 72 extends. When the rod seal 92 is in a relaxed state, the diameter of the opening 100 is slightly smaller than the diameter of the piston rod 70.

A cylindrical piston 102 inside the cylinder housing 21 (FIG. 1) is operatively connected to the rod 70 to move the rod 70 axially relative to the housing 21. The piston 102 (FIG. 8) has a body 103 with a wall 105 extending forwardly from a front end of the body 103 to form a forwardly facing cylindrical wall 104. Both the well 104 and the outer surface of the cylinder 102 are coaxial about the axis X. The well 104 has a flat bottom 106 (which also defines the forward surface of the piston body 103). A thin circular groove 110 is formed in the side wall of the well 104 approximately one fourth of the distance from the bottom 106 and the end surface 108 of the wall 105. A shallow cylindrical end bore 112 is formed in the back surface of the piston body 103. The end bore 112 is approximately half the diameter of the well 104, is formed coaxial about the axis X. A long, narrow bore 114, coaxial about the axis X, extends from the base of the end bore 112 into the piston body 103. The bore 114 may be threaded or unthreaded. A circular notch 116, coaxial with the axis X, is formed at the back edge of the piston body 103. The notch 116 has a cylindrical face 118 that runs parallel to the outer surface of the piston 102 and a flat shoulder 120 that is perpendicular to the axis X. The face 118 encircling the end bore 112 forms a ring 122 on the end of the piston 102 that has a flat, circular end face 124 directed away from the well 104.

When properly assembled, the disc 74 of the piston rod 70 fits inside the well 104 of the piston 102 between the bottom 106 and the groove 110. A retaining ring 125 (FIG. 1) is housed in the groove 110 to retain the disc 74 in proximity to the bottom 106 of the well 104 the disc 74 has an outer diameter that is less than the diameter of the well 104, and a front-to-back width that is less than the distance from the well bottom 106 to the retaining ring 125. Hence, the disc 74 floats in the well 104. Because the disc 74 fits loosely within the well 104, the piston rod 70 and the piston 102 can move with limited independence from one another within the cylinder 20.

A seal retainer 126 is configured to mate against the end of the piston 102 opposite the well 104 (FIG. 1) The retainer 126 is designed to fit against the end of the piston 102 opposite the well 104. The retainer 126 (FIG. 9) comprises an end wall 128 having a diameter substantially equal to the diameter of the piston body 103. A stem 130 extends forwardly of the end wall 128. The stem 130 has a diameter sized such that the stem 130 can be received in the back well 112 of the piston 102. A shallow cylindrical end bore 132, is formed in and concentric with the end wall 128; and a bore 134, concentric with the bore 132, extends from the base of the end bore 132 completely through the retainer stem 130. The disc 130 is sized to fit snugly and fully into the end bore 112 such that when properly assembled, the disc 128 abuts the end face 124. A screw 135 (FIG. 1) extends through the retainer bores 132 and 134 and is screwed into the piston bore 114 to hold the retainer 126 in proximity to the back face 124 of the piston 102. As can be appreciated, when the retainer 126 is secured to the piston 102, the piston and retainer, in combination, from a groove (which is defined in part by the piston notch 116).

Figure 10:
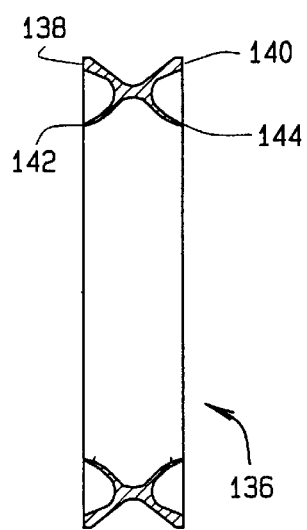
FIG. 10 is a longitudinal cross-sectional view of a piston seal for the cylinder of FIG. 1.
Figure 10A:
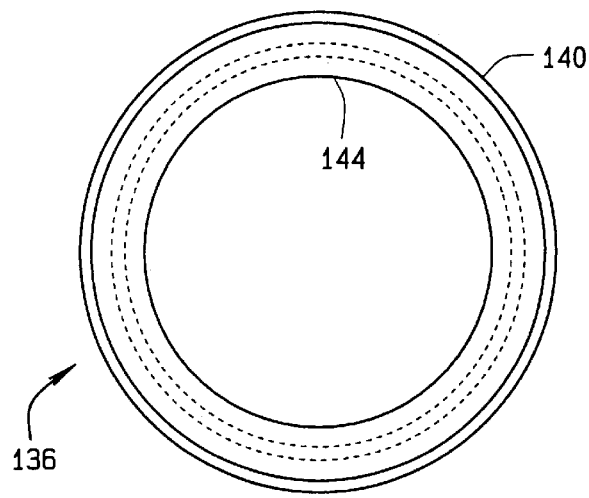
FIG. 10A is an end view of the piston seal in FIG. 10.

An elastic seal 136 (FIG. 1) is received in the notch 116 in the piston 102 and is held in place in the notch 116 by the retainer 126. The retainer 126 thereby constrains the seal ring 136 to a position about the notch 116. The seal ring 136 has a generally X-shaped cross section (FIG. 10) that is symmetric about its central vertical axis;, with two outer arms 138 and 140, and two inner legs 142 and 144. The shape and elastic nature of the seal ring 136 allow for repeated radial expansion and contraction of the seal ring 136. The height of the seal ring 136 is slightly greater than the width of the notch 116 such that when the cylinder 20 is properly assembled and not activated, the tops of the arms 138 and 140 press against the cylindrical inner walls of the housing 21 (FIG. 1) to form a seal between the piston 102 and the housing 21.

Again referring to the fully assembled cylinder 20 in FIG. 1, it is evident to one skilled in the art that movement of the piston 102 toward the front head 26 causes the bottom 106 of the bore 104 to push against the disc 74 of the piston rod 70 and thereby drive the piston rod 70 in the same direction. When the piston 102 moves instead toward the rear end cap 24, the washer 125 will push against the disc 74 and pull the piston rod 70 rearwardly in the housing as the piston moves rearwardly in the housing.

When the cylinder is assembled, as seen in FIG. 1, and is connected to a source of pressurized gas via the rear port 44 and the forward port 68, a gas pressure p1 will exists in the forward portion of the cavity 28 nearest the front head 26, and a gas pressure p2 will exist in the rear portion of the cavity 28 on the other side of the piston 102. The gas cylinder 20 functions by controllably varying gas pressures in the cavity 28 on each side of the piston 102. When gas, such as air, is forced into the cavity 28 of the cylinder 20 through the port 68 in the front head 26, the pressure p1 increases. When the pressure p1 exceeds the pressure p2, a small amount of the gas will force its way along the outer surface of the piston 102 and fill the space between the shoulder 120 and the piston seal 136. This causes the piston seal 136 to momentarily compress radially. As the pressure p1 increases, compression of the piston seal 136 will cease as the gas fills the spaces between the seal arms 138 and 140 and the legs 142 and 144. The gas then flows over the top of the seal ring 136, past the seal retainer 122, and into the rear portion of the chamber 28 nearest the rear end cap 24 at a controlled rate. An equilibrium thereby arises between the gas flow, the gas pressure, the expansion properties of the piston seal 136 and the dimensions of the piston seal 136, the piston 102, the seal retainer 126, and the diameter of the cavity 28. In particular, the length of the cylindrical surface of the piston 102 is critical in establishing this equilibrium. The piston seal 136 thereby acts as a regulator of gas flow and gas pressure about the piston 102 in the cavity 28. The flowing gas thereby controllably envelopes the piston 102, the seal retainer 126 and the piston seal 136, and forms a gas cushion around the piston 102 between the sidewall of the cavity 28 and the piston, seal retainer and seal ring. The piston 102 will "float" in this gas cushion, thereby reducing friction in the cylinder.

In a similar manner, some of the gas entering the forward portion of the cavity 28 passes through the end bore 88 of the rod seal retainer 84, through the gap between the rod seal 92 and the piston shaft 72, through the gap between the through bore 66 and the piston shaft 72, and out the distal end of the front head 26. Because the annular lip 96 of the rod seal 92 is angularly directed toward the forward portion of the cavity 28, as the pressure p1 builds, the annular lip 96 is flexed toward the piston rod 70 to seal against the rod 70 to restrict the gas flow between the piston rod 70 and the through bore 66. An equilibrium thereby arises between the gas flow, the gas pressure, the expansion properties of the rod seal 92 and the dimensions of the rod seal 92, the rod 70, and the diameter of the through bore 66. In particular, the length of the cylindrical inner surface of the through bore 66 is critical in establishing this equilibrium. The rod seal 92 thereby acts as a regulator of gas flow and gas pressure about the rod 70 in the through bore 66. The flowing gas thereby controllably envelopes the rod 70 to form a cushion between the rod 70 and the sidewall of the through bore 66 to reduce friction in the cylinder.

Because the disc 74 fits loosely within the piston well 104 and between the bottom 106, the piston rod 70 and the piston 102 will each float, independent of one another, on their own separately regulated cushions of gas within the cylinder 20. For example, for a 1.25" diameter gas cylinder that uses air as the gas, under operational pressures of up to about 100 psi, components in the cylinder 20 have the following dimensions: diameter of the cavity 28 of about 1.25 inches; outer diameter of the piston 102 of about 1.246 inches; outer diameter of the seal retainer 126 of about 1.24 inches; length of the outer surface of the piston 102 of about 2.01 inches; diameter of the through bore 66 of about 0.38"; length of the through bore 66 of about 2.339"; and diameter of the piston rod 70 of about 0.3747". This results in an air gap about the piston 102 of about 0.004" and an air gap about the piston rod 70 of about 0.0053". In this example, the rod seal 92 has an outer diameter of about 0.714", a width of about 0.205", an inner diameter of about 0.367", and a lip angle of about 45°, while the piston seal 136 has an outer diameter of about 1.255", an inner diameter of about 0.88", a width of about 0.263", leg angles of about 32° and about 47°, and arm angles of about° and about 23°.

Of course, the exact shape and size of the rod seal 92 and the piston seal 136 can be varied to obtain a desired gas cushion for various component sizes and operating conditions. Furthermore, the seals can be readily removed or replace for differing environmental applications, and a series of calibrated seals can be established for ease of use. For example, a greater pressure differential on both sides of the piston 102 may require less gas flow and a tighter seal ring 136 to achieve acceptable gas cushion characteristics, or a larger cylinder 20 may require both a greater pressure differential and greater gas flow to support larger piston components. If the piston rod 70 is larger, a greater gas pressure or gas flow may be necessary to maintain an acceptable gas cushion in the through bore 66.

All of the components in the preferred embodiment, except the piston rod 70, the washer 125 and the screw 135, are formed from a high molecular weight, low coefficient of friction, plastic or polymer material having a molecular weight in excess of 500,000 weight-average, and a relative coefficient of sliding friction less than 0.4. Preferably the material will have a weight greater than 3,000,000 weight-averaged, and coefficient of than 0.15, such as that material offered for sale by Garland Manufacturing Company under the trade name "GAR-DUR." The cylinder 20, except the piston rod 70, the washer 125 and the screw 135, are all preferably formed of stainless steel. GAR-DUR provides the benefits of an extremely low coefficient of friction and low chemical reactivity. Further, all the parts of the cylinder are unitary, one-piece parts. For example, the front and back heads and piston can be machined from bar stock. The seal retainers can be machined from bar stock or tube stock; and the seals can be machined from tube stock.

Figure 11:
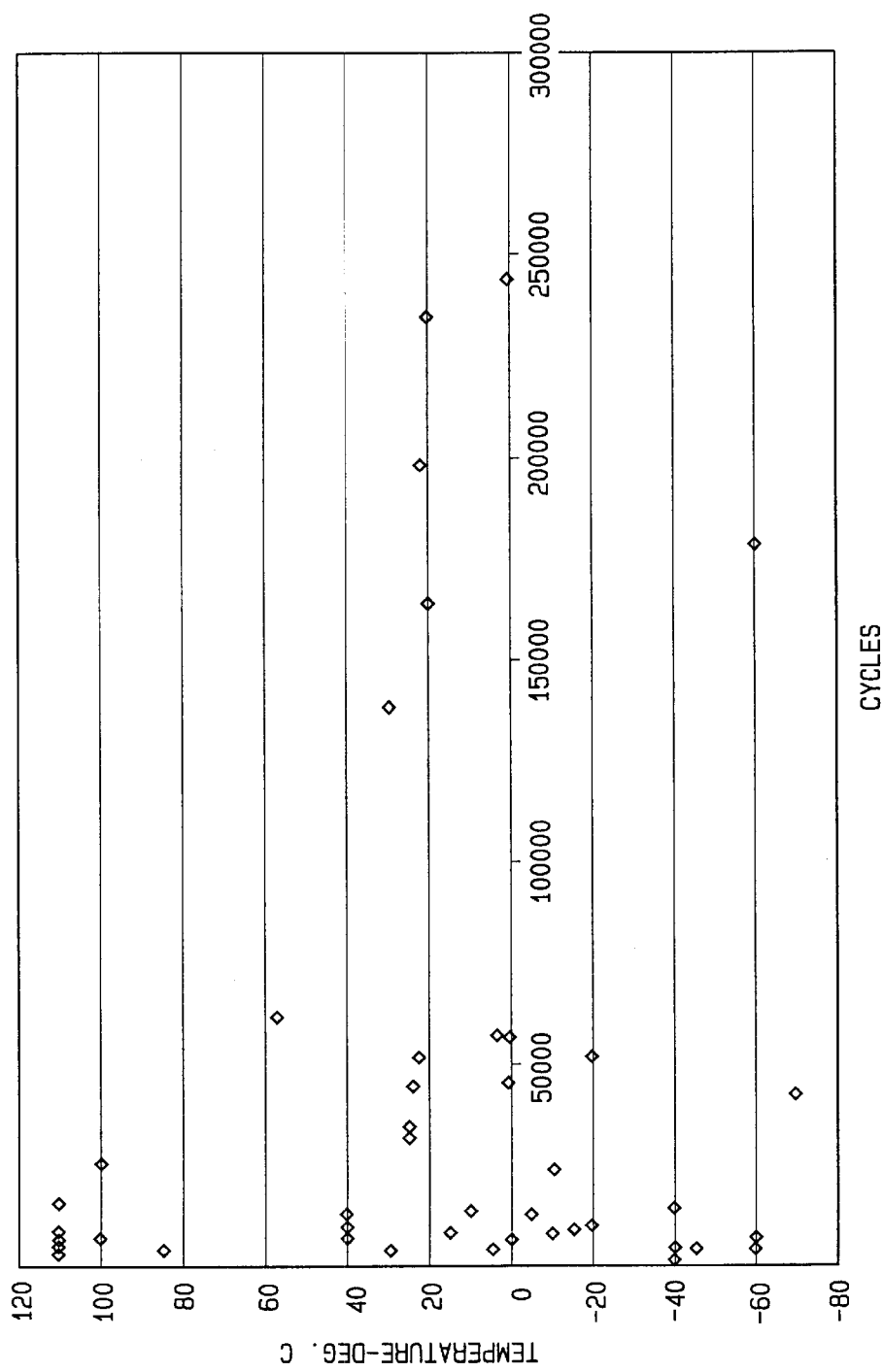
FIG. 11 is a chart containing tabulated durability test data and two graphs of that data for the gas cylinder of FIG. 1.

These material properties, in conjunction with the design considerations and parameters described herein, enable the present invention disclosed to operate for unprecedented and unexpectedly long periods of time under extremely adverse conditions and with out any lubrication. For example, a cylinder of the present design has been operationally tested at a number of temperatures as set forth below in Table 1, and as shown in FIG. 11.

TABLE I

| Test # | Cycles | Temp. ° C. | Test # | Cycles | Temp. ° C. |
|--------|--------|------------|--------|--------|------------|
| 1 | 164300 | 20 | 23 | 25340 | 100 |
| 2 | 235170 | 20 | 24 | 56570 | 3 |
| 3 | 244415 | 1 | 25 | 62000 | 57 |
| 4 | 6670 | 40 | 26 | 23614 | -10 |
| 5 | 3630 | 85 | 27 | 198986 | 22 |
| 6 | 6550 | 100 | 28 | 12500 | 40 |
| 7 | 8250 | 110 | 29 | 3166 | 110 |
| 8 | 9300 | -20 | 30 | 5734 | 0 |
| 9 | 570 | -40 | 31 | 45100 | 1 |
| 10 | 5740 | -60 | 32 | 13100 | 10 |
| 11 | 43875 | 25 | 33 | 51750 | 23 |
| 12 | 7940 | 15 | 34 | 3400 | 30 |
| 13 | 3390 | -45 | 35 | 7650 | -10 |
| 14 | 138670 | 30 | 36 | 4154 | 110 |
| 15 | 3330 | 5 | 37 | 51346 | -20 |
| 16 | 8420 | -15 | 38 | 3670 | -40 |
| 17 | 5930 | 110 | 39 | 178530 | -60 |
| 18 | 56130 | 0 | 40 | 3590 | -60 |
| 19 | 12000 | -5 | 41 | 41770 | -70 |
| 20 | 13580 | -40 | 42 | 15450 | 110 |
| 21 | 9430 | 40 | 43 | 31650 | 25 |
| 22 | 33740 | 25 | 44 | 25340 | 100 |

As can be seen, this test cylinder operated without lubrication for over 12.25 million inches 3.2 million strokes, at temperatures ranging from −70° C. to 110° C. These durability tests would be unexpected for any typical gas cylinder, but unprecedented for a gas cylinder without lubrication. In addition, because the housing 21, the piston 102 and the seal 126 are all made of an elastic material, the piston 102 and the seal retainer 126 can strike the ends of the cavity 28 with great force without suffering significant permanent distortion. Accordingly, the present invention is capable of "bottoming out" with out incorporation of additional cushioning or dampening components, and without suffering a signified reduction in cylinder life. Further, because the major components (except for the rod 70) of the cylinder are all made from the same material, the components will all expand and contract at the same rate.

As discussed above, testing has shown the components of the present invention, includes the seals 92 and 136, exhibit very little wear over multiple millions of inches of operation. However the preferred embodiment can be conveniently disassembled for ready replacement of either seal 92 or 136 as routine maintenance or if cylinder begins to function inefficiently.

Figure 12:
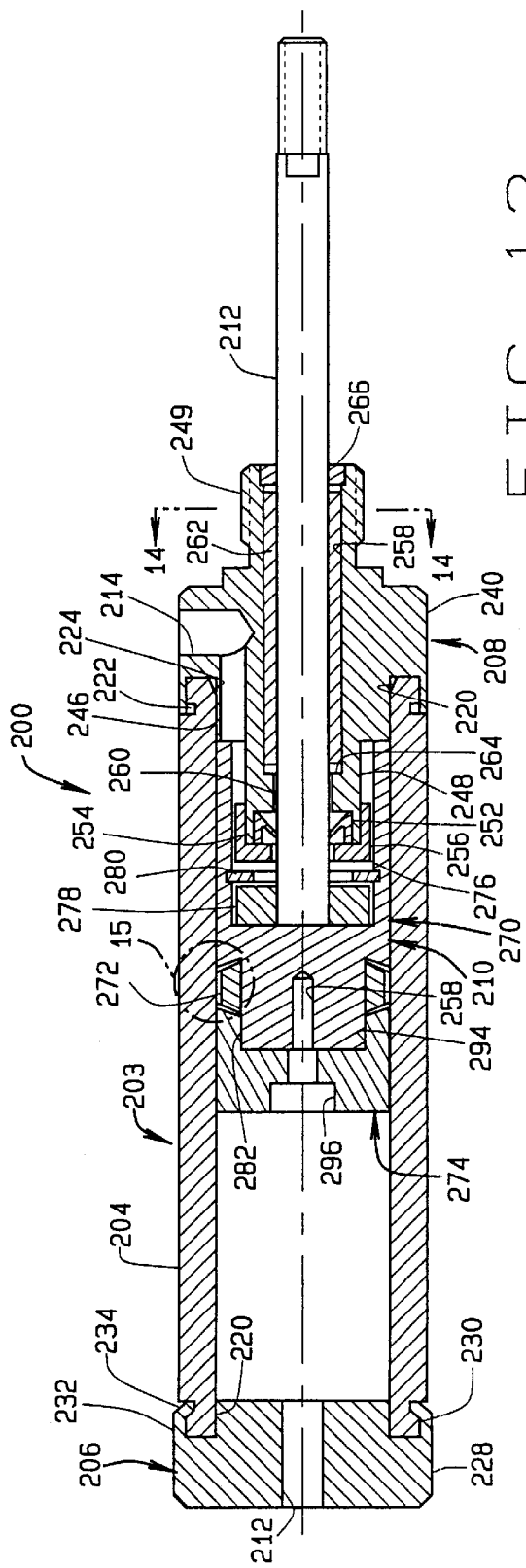
FIG. 12 is a longitudinal cross-sectional view of a second illustrative embodiment of the gas cylinder in which the piston seal and the connection between the cylinder tube and front and rear end caps are modified, and a bushing is provided for the rod in the front end cap bore.

A second embodiment of the invention is shown in FIGS. 12–16. The cylinder 200 of FIG. 12 is substantially similar to the cylinder 20 of FIGS. 1. The cylinder 200 includes a housing 203 having a tube 204 a rear end cap 206 and a front head 208. The housing defines a cavity or chamber in which a piston assembly 210 is slideably received. A piston rod 212 is operatively connected to the piston, and extends through the front head 208 to be moved with the piston assembly 210. The rear end cap and front head include gas ports 212 and 214, respectively to admit gas into the piston housing to move the piston, and hence the piston rod, axially relative to the housing 203. As with the cylinder 20, the tube 204, piston assembly, and associated seals (which are described below) are all formed from a high molecular weight, low coefficient of friction, plastic or polymer material having a molecular weight in excess of 500,000 weight-averaged, and a relative coefficient of sliding friction less than 0.4. Preferably the material will have a molecular weight greater than 3,000,000 weight-averaged, and coefficient of sliding friction less than 0.15, such as that material offered for sale by Garland Manufacturing Company under the trade name "GAR-DUR." The rear end cap and the front head, on the other hand, are formed from a metal, such as aluminum or stainless steel.

Referring more generally to the FIGS., the cylinder tube 204 is of generally constant diameter and width. A narrower wall or lip 220 is formed at the opposite ends of the tube 204, and extends axially relative to the tube 204. The tube lips 220 have inner surfaces that are co-linear with, and hence an extension of, the inner surface of the tube 204. A groove 222 is formed around the outer surface of the lips 220, near the base of the walls 220. Additionally, the inner surfaces of the lips 220 are slightly beveled near their ends, as at 224.

The rear head or end cap 206 includes a body 228 with a groove 230 formed in a forward surface of the body. The body 228 has an outer diameter substantially equal to the outer diameter of the tube 204. The groove 230 has a width and depth approximately the same as the width and depth of the tube lip 220. The inner surface of the groove includes a series of barbs 231 which face inwardly relative to the groove 230. The barbs 231 are small, preferably only about 5 mils. The end cap 206 is applied to the tube 204 by press fitting the tube lip 220 into the end cap groove 230. When the tube is press fit into the groove 230, the barbs 231 (which are harder than the tube) will bite into the tube lip to hold the end cap and tube together. Additionally, the wall 232 is then rolled over, as at 234, into the groove 222 in the tube lip 220 to further provide a grip between the end cap 206; and the tube 204. As can be seen at the back of the cylinder 200, when the end cap wall 232 is rolled, the end cap wall 232 fills the tube rim wall groove 222, and the rim wall is deflected or deformed, such that there is substantially no gap between the rim wall 220 and the end cap groove 230. Hence, an air (or gas) tight seal is formed between the end cap and the tube.

The front head 208 is substantially similar to the front head 26 of FIG. 1. The front head 208 has a body 240 which is stepped as at 242 along a rear surface to define a shoulder 244 and a reduced diameter section 246. A rear stem 248 extends from the reduced diameter section; and a nose 249 extends forwardly from the front of the body 240. A groove 250 is formed in the shoulder 244. The groove 250 is formed identically to the groove 230 of the rear end cap 206, and includes barbs along its inner annular surface. The groove 250 is sized to receive the rim wall 220 of the tube, such that the tube rim wall 220 can be press fit into the groove 250. The rim wall 220 is then rolled as described above in conjunction with the rear end cap 206.

As noted, the rear end cap and front head are both made from a metal, where as the cylinder tube 204 is made from a plastic. Hence, the tube will expand and contract at a different (and faster) rate than the rear end cap and front head due to changes in temperature. When the temperature is reduced, the tube will contract more quickly than will either the rear end cap or the front head. Hence, the tube lip 220 will further grip the barbs 231. On the other hand, when the ambient temperature increases, the tube will expand more quickly than either the end cap or the front head, and the outer surface of the lip 220 will press against the outer wall of the groove 230. Thus, in either instance, as the ambient temperature to which the cylinder is changed, an air (or gas) tight seal will be maintained at the juncture of the tube 204 with the end cap and front head.

A cup 252 is formed in the rear of the head to receive a rod seal 254. The rod seal 254 is identical to the rod seal 92 of the cylinder 20, and will not be described again. The rod seal 254 is retained in place by a retainer 256 which is threaded onto the end of the head 208. The retainer 256 is identical to the retainer 74 of cylinder 20, and will not be described herein.

A passage or bore 258 extends through the body 240 and nose 249 of the front head 208. A short passage 260 extends between the cup 252 and the passage 258. The rod 212 extends through the cup 252, and the passages 260 and 258 to extend out of the nose of the front head 208. The rod 212 is sealed by the rod seal 254 as described above. The passage 260 is slightly larger than the diameter of the rod 212 to allow the rod 212 to move axially freely through the passage 260. The passage 258, however, is larger in diameter than both the passage 260 and the rod 212.

A sleeve bearing or bushing 262 is received in the passage 258. The bushing 262 has an outer diameter slightly smaller than the diameter of the passage 258 and an inner diameter that is slightly larger than the diameter of the rod 212. The bushing 262 can thus slide freely within the passage 258, and the rod 212 can reciprocate freely within the bushing 262. The bushing 262 has a length slightly less then the length of the passage 258, and is retained at one end by the shoulder 264 formed between the passages 258 and 260, and at its opposite end by a metal washer 266 which is fixed (by any conventional method) to the front head 208 at the end of the passage 258. The bushing 262 has at least one axial slit 268 which extends the length of the bushing. More slits 268 can be provided, and in FIG. 14, four slits 268 are shown. The bushing 262, like the tube 204, is preferably made of a high molecular weight, low coefficient of friction, plastic or polymer material, such as the GAR-DUR plastic noted above. The bushing 262 has a different coefficient of expansion than the rod 212, which is metal, and expands and contracts more quickly than does the metal rod 212. By providing at least one slit in the bushing 262, the bushing will not clamp down around rod when it contracts in extreme cold temperatures, and hence the cylinder will not lock up due to undue frictional engagement between the rod 212 and the head bore 258. Thus, when the bushing contracts, the pieces of the bushing will all contract; however, rather than reducing the size of the inner diameter of the bushing to the point at which the rod will be locked in the bushing and unable to move relative to the bushing, the bushing sections will contract relative to each other (or in the case of a single slit bushing, the slit will increase in size). Hence, the bushing will not constrict around the rod 212, and the rod 212 will still be able to slide freely through the bushing, even at extremely low temperatures (i.e., below −40° C.).

The piston assembly 210 includes a piston body 270, a piston seal 272, and a piston seal retainer 274 to hold the seal 272 in place on the piston body 270. The piston body 270 has a well 276 formed in its front end. The piston rod 212, which has a washer 278 fixed to its back end, as described above with respect to the rod 70 of cylinder 20, is retained in the well 276 by means of a retaining ring 280, again, as described above in conjunction with the cylinder 20.

Figure 15:
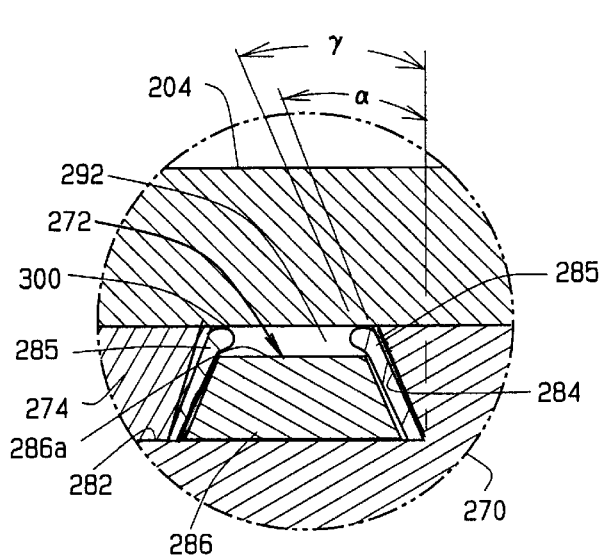
FIG. 15 is an enlarged sectional view of the piston seal taken along circle 15 of FIG. 12.

A stem 282 extends rearwardly from the back of piston body 270. The stem 282 (which has a smooth outer surface) has a smaller diameter than the piston body 270. Hence, the body 270 and stem 282 define a rear shoulder or surface 284. As seen in FIG. 15, the surface 284 is not perpendicular to the outer surfaces of the stem 282 and body 270. Rather, the shoulder defines an angle a with the vertical (or diameter of the cylinder) of at least 10°, and preferably not greater than about 35°. More preferably, the angle α is between about 15° and about 25°. It has been found that an angle α of about 19° works well.

The seal 272 is journaled on the stem 282. As can be seen, the seal 272 is spaced forwardly of the end of the piston. As noted above, the cylinder tube 204 and end caps 206 and 208 are made from different materials, and hence expand and contract at different rates. However, the seal 272 and the cylinder tube 204, which are both made from the same material, expand at the same rate. Due to the connection of the tube 204 to the end caps 206 and 208, expansion and contraction of the tube 204 at the end cap will be hindered by the end cap. If the seal were located at the rear of the piston, and in the area of the tube where expansion and contraction is hindered, the seal would expand (and contract) more quickly than the tube, and hence, an improper seal would be obtained. Thus, the seal 272 is positioned forwardly of the end of the piston to a point where the connection of the tube to the end cap will not affect the expansion and contraction of the tube. Preferably, in a 1¼" tube, the seal is located about ¾" from the end of the piston. This distance can change for different diameter tubes. Hence, the change in temperature and the different rates of expansion and contraction, will not affect the seal formed between the seal 272 and the cylinder tube inner wall.

Figure 16:
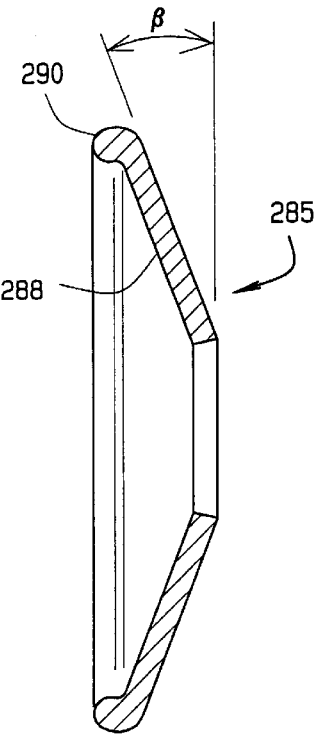
FIG. 16 is an enlarged cross-sectional view of a sealing disc of the piston seal.
Figure 18:
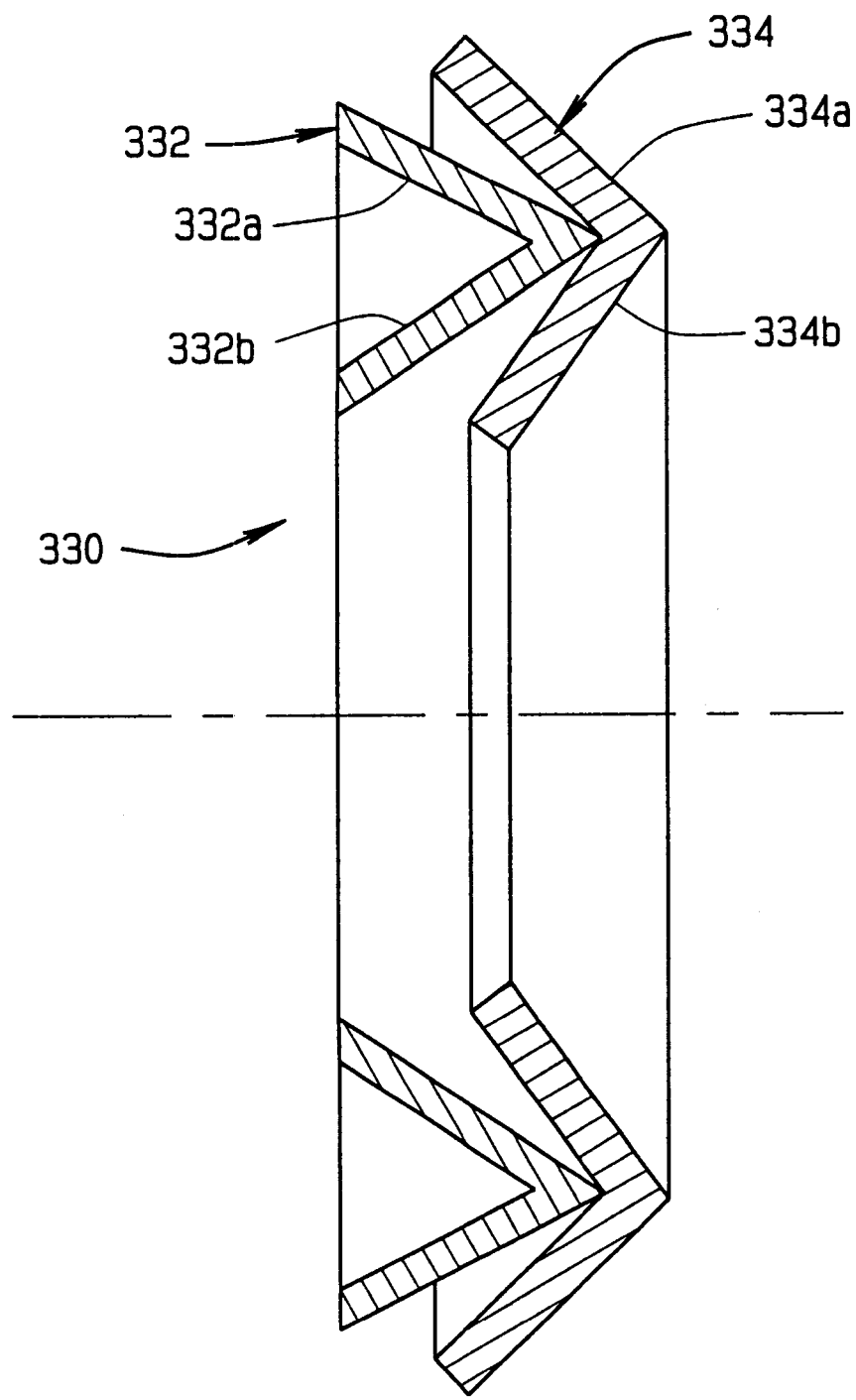
FIG. 18 is a cross-sectional view of the rod seal of the cylinder of FIG. 16.

The seal 272 includes a pair of spaced apart sealing discs 285. Preferably, the two seal discs are separated by a spacer 286. The seal discs are identical to each other, and preferably in the form of a washer having sloped surfaces, giving the seal discs a generally trapezoidal shape in cross-section, as seen in FIG. 16. The seal discs 285 include a main section 288 with a rounded head 290. The seal head 290 is preferably formed as a semi-circle with a radius equal to the width of the main section 288. The seal discs 285 have an inner diameter sized to allow the seal discs 285 to slide over the piston stem, and an outer diameter sized such that the head 290 engages the inner wall of the tube to form a seal between the seal discs and the tube. As can be appreciated, as the piston moves, the seal moves relative to the cylinder tube. The rounded head 290 helps prevent the seal discs from catching on the cylinder tube and locking the piston relative to the cylinder tube.

As noted, the seal discs 285 are not flat washers, but are angled. The seal discs form an angle β with the vertical (or diameter of the cylinder) which is greater than the angle α defined by the piston shoulder 284. Preferably, the angle β is greater than 15°, and preferably not greater than about 35°. Generally, when a device is provided with two sealing elements (i.e., the two sealing arms), the sealing elements face the same direction. However, for purposes discussed below, in the cylinder 200, contrary to conventional practice, the two sealing discs face towards each other. That is, the forward sealing disc is sloped rearwardly and the rear sealing disc is sloped forwardly.

The sealing discs, as noted above, are separated by the spacer 286. The spacer 286, which is annular, defines a regular trapezoid in cross-section. It has two sloping side walls, each of which defines an angle γ with the vertical of between about 10° and about 35°. The angle γ is larger than the angle β defined by the sealing discs 285 (and hence larger than the angle α defined by the back surface 284 of the piston body 270). With an angle α of about 19° and an angle β of about 28°, it has been found that an angle γ of about 32° works well. The spacer 286 as noted is annular. It has an inner diameter slightly greater than the diameter of the piston stem 282, so that the spacer can slide on the stem 282. The spacer's outer diameter, however, is less than the inner diameter of the cylinder tube 204, so that there is a gap 292 between the radial outer surface 286a of the spacer and the inner surface of the tube 292.

The spacer 286, and the two sealing discs 285 are held in position by the retainer 274. The retainer 274 defines a bore 294 in its front surface which is sized to fit over the stem 282 of the piston body. A sunken screw hole in the back of the retainer 274 is aligned with a screw hole 298 in the back surface of the piston stem 282; and a screw (not shown) extends through the two holes to secure the retainer 274 in place on the stem. The front surface 300 of the retainer is sloped toward the stem back surface 284, as seen best in FIGS. 12 and 15. Hence, when the retainer 274 is placed on the piston stem, the retainer, piston stem, piston back surface, and tube inner surface define a trapezoidal shaped space in which the seal 272 is received. The angle defined by the retainer front surface 274 with the vertical is about the same as the same as the angle α defined by the piston back surface 284. The bore 294 can be sized, in length, such that the seal 272 can move slightly axially over the piston stem. Stated differently, the retainer need not maintain a tight fit between the seal 272 and the retainer front surface 300 and the piston body back surface 284; nor does there need to be a tight fit between the elements of the seal (i.e., the two seal discs 288 and the spacer 286.

The cylinder tube, piston, retainer, and seal (including the seal discs and spacer) are all preferably made from the same material, and are preferably made a high impact, low friction coefficient plastic, such as the from Gar-Dur® noted above. By making these elements from the same material, they will all contract and expand due to changes in temperature at the same rate. The seal discs are sized to be flexible, as will be described below, so that they can flex into the gap 292 between the spacer and the inner wall of the cylinder tube. In a cylinder that is 1¼" in diameter, the gap 292 is preferably about 62 mils (i.e., about 1/16"), and the width of the seal discs (from their front surface to back surface) is preferably about 12 mils. When the cylinder is at rest (i.e., the piston is not moving), the seal discs 285 are in the position substantially as seen in the Figures, with the heads 290 of the seal discs 285 engaging the cylinder tube inner surface to form a seal therewith. When air is blown in through the rear end cap port 212, the air flows around the retainer 274 and impinges against the back surface of the rear seal disc. The pressure against the rear seal disc causes the rear seal disc to bend forwardly, and the gap 292 becomes pressurized. The pressurization of the gap causes the forward seal arm to more forcibly engage the cylinder tube inner surface to form a tight seal with the cylinder tube. The piston will then be pushed forwardly by the air pressure in the back of the cylinder tube. When the air flow is reversed, and air is directed in to the cylinder through the front head port 214, the air will flow over the piston body, and the initial burst of air will bend the forward seal disc 285 rearwardly, to unlock the seal between the forward seal disc and the cylinder tube, and to again pressurize the gap 292, causing the rear seal arm to more forcibly engage the cylinder tube inner surface to form a tight seal with the cylinder tube. As noted above, the seal discs face each other. If they were parallel to each other, then the piston could only be moved in a single direction (i.e., forwardly or rearwardly). The fact that the forward seal disc faces rearwardly and that the rear seal disc faces forwardly allows the respective seal disc to seal against the inner tube and to be unlocked from the sealed positions as described above. If the seal discs were parallel, the seal between the seal discs and the inner tube could not be unlocked, and the cylinder would lock up. With the seal 272, when gas is introduced into the cylinder through one of the ports, the respective half of the cylinder chamber is pressurized to move the piston axially. This introduction of gas into the chamber forms a cushion of gas about the piston. Thus, when gas is introduced into the cylinder through the rear port to move the piston and rod forwardly, a cushion of gas is formed about the piston rearwardly of the forward sealing disc. Similarly, when gas is introduced into the cylinder through the forward port to move the piston and rod rearwardly, a cushion of gas is formed about the piston forwardly of the rear sealing disc. As with the cylinder 20 of FIG. 1, this cushion of gas surrounds the respective portion of the piston and the piston floats or rides on the cushion of gas. This cushion of gas reduces friction in the cylinder between the rod and the cylinder tube to facilitate lubricant free operation of the cylinder.

The difference in the angles α, β, and γ, and the height of the gap 292 allow the seal discs to move and flex within cylinder between the sealing position when the piston is being moved and an unlocked position, as described above. The angles, gap sizes, and seal widths described above all work well with an 1¼" cylinder. In a bigger cylinder, the seal discs can have a greater width, and hence, the angles and gap sizes could change. Similarly, in a smaller cylinder, the seal discs would be narrower, and hence the angles and gap size could also be smaller. What is important, is that the difference in the three angles, the gap size, and the seal disc width be sufficient to allow the seal discs to flex into the gap to allow the seal between the seal discs and the cylinder tube to be unlocked upon an initial burst of air against the seal. Hence, for example, if the spacer 282 is too wide (i.e., the gap 292 becomes too small), then the spacer will rigidize the seal discs, and the seal discs will not be able to flex into the gap to be come unlocked from the cylinder tube.

A third illustrative embodiment of the cylinder is shown in FIG. 16. The cylinder 200' of FIG. 16 is substantially similar to the cylinder 200 of FIG. 12. Only the differences between the two cylinders will be pointed out. The cylinder 200' uses a piston seal 272. However, the retainer of the cylinder 200 is replaced with a retaining ring 274' which is held in place with a snap ring 320 which is received in a groove in the piston stem. The use of the snap ring 320 and the retaining ring 274' eliminates the use of the screw that held the retainers 274 (FIG. 12) and 126 (FIG. 1) in place on the respective piston bodies. The rod seal retainer has been eliminated, and replaced with a snap ring 322 which is received in a groove formed on the inner surface of the cup 252' in the rear stem 248' of the cylinder front head 208'. The screws can come loose during operation of the cylinder from due to vibrations. The elimination of the screws from the cylinder 200' substantially eliminates the problem of parts coming loose due to vibrations.

Figure 17:
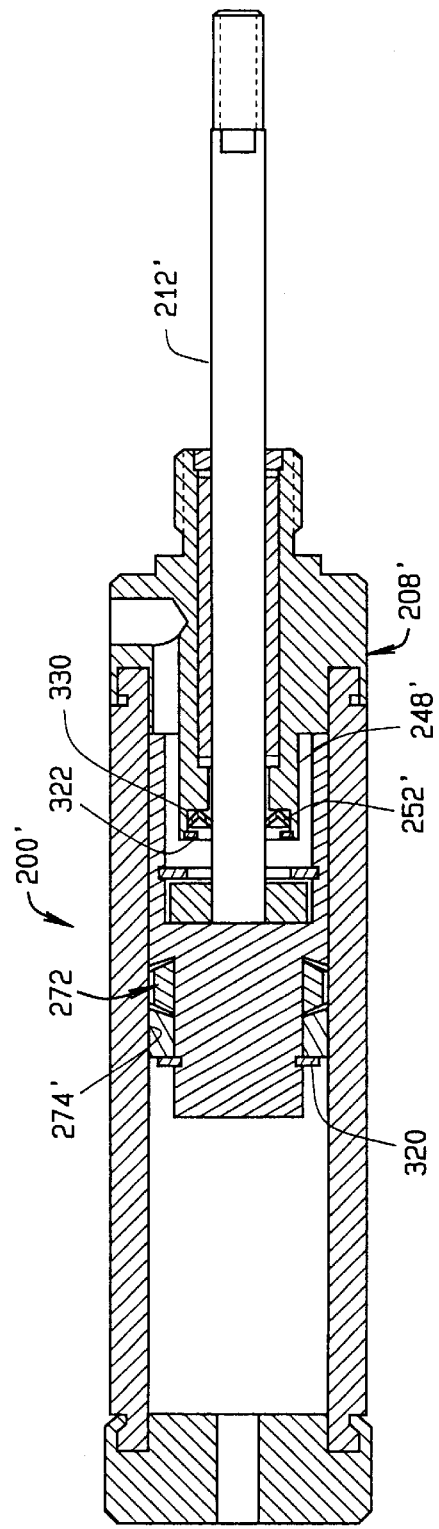
FIG. 17 is a longitudinal cross-sectional view of a third illustrative embodiment of the gas cylinder in which the rod seal and the piston seal retainer are modified.
Figure 13:
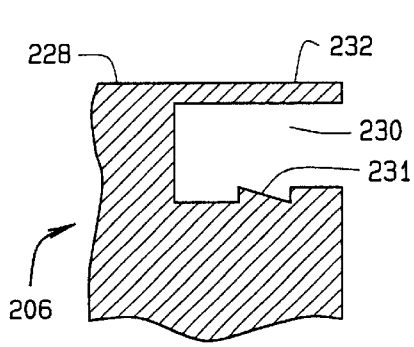
FIG. 13 is an enlarged fragmentary cross-sectional view of a groove in the front and rear end caps of the cylinder of FIG. 12.
Figure 14:
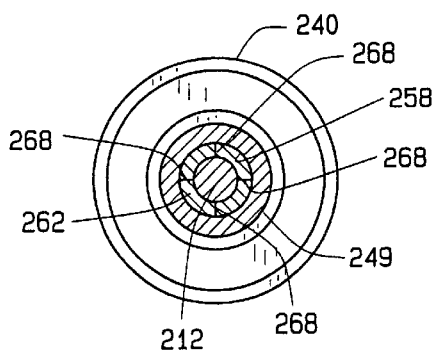
FIG. 14 is a cross-sectional view taken through line 14—14 of FIG. 12.

The rod seal 330, as seen in FIG. 17, rather than being generally of a "V" or "v" shape, is shaped more like two angle brackets connected together at their apexes. The shape can also be described as a K-shape in which the back of the "K" is bent or angled around the two legs of the "K". Hence, the rod seal 330 includes a rear angle portion 332 having legs 332a,b and a forward angle portion 334 having legs 334a,b. The legs of each portion meet at an apex, and the two portions are connected together at their apexes, such that the legs 334a,b of the forward portion surround the legs 332a,b of the rear portion. The seal legs are made of a material and have a width, which will allow the legs to flex within the cup 252'. Preferably, the seal is made from a high impact, low friction plastic, such as the Gar-Dur®, noted above, and is sized to be flexible. The rod seal 330 is installed so that it faces rearwardly, with the apex of the seal adjacent the floor of the cup 252', the legs 332a and 334a adjacent the wall of the cup; and the legs 332b and 334b adjacent the rod 212'. In operation, when the piston and rod are advanced forwardly or rearwardly, air will flow into the forward bore of the piston and into the cup 252' of the forward head 208'. This air will cause the seal legs to flex apart to more tightly engage the rod and the cup wall. However, when the piston and rod rearwardly are moved rearwardly, because the seal faces rearwardly, the seal legs will not bite into the rod, or otherwise lock up against the rod. Thus, the seal 320 will have a tight seal with the rod only during operation of the piston in one direction.

As noted above, the cylinder 20 (FIG. 1) can be disassembled. However, because the heads and tubes of the cylinders 200 and 200' are press fit together, the cylinders cannot be disassembled.

Additional variations on the basic construction are also available. For example, the cylinders can contain more than one rod seal and/or more than one piston seal. The rod seal 92 may have more than one annular lip 96, and the lips 96 may be facing in either or both directions along the piston rod 70. The piston seal 136 may have only one leg 144, or more than two, or may have only one arm 138, or more than two. The seals may be hollowed for additional elasticity, and may be thinner or wider for varying applications. The components may all be formed of materials other than GAR-DUR and aluminum or stainless steel. The piston seal retainer may be screwed, glued or soldered to the piston 102, thereby relieving the need for the screw 135. The end caps may be attached to the tube with clamps or additional screws, instead of being screwed directly into the tube. The end caps can also be welded to the tube, or secured to the tube in any other conventional manner. Additional seals may be added to the cylinder, such as between the rear end cap and the tube, to contain or limit gas leakage. Furthermore, a radial groove may be formed in the wall of the front head bore for placement of the rod seal 136, alleviating the need for the rod seal retainer. The washer at the back end of the piston rod can be replaced with a plate, which extends from the rod. Such a plate could be square, round, rectangular, or any other desired shape, as long as it has a dimension greater than the inner radius of the retainer to hold the rod relative to the piston. Although the seal 272 is shown to be made of three parts (the spacer and the two sealing discs), the seal 272 could be made as a single unitary part, provided that the sealing portions of the one-piece seal can flex or pivot as described above.

The detailed description above illustrates the invention by way of example and not by way of limitation. This description clearly enables one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

What is claimed is:

1. A gas cylinder comprising:
   a housing comprising a tube, a front end cap and a rear end cap defining a chamber; said front end cap including an opening therethrough;
   a piston received in the chamber for axial movement within the chamber;
   a piston seal between said piston and said tube;
   a rod operatively connected to the piston and extending forwardly from the piston and through said front end cap opening to exit the chamber through the front end cap; and
   one or more gas ports in the housing to allow the input and exhaust of gas in the chamber;
   the piston being sized relative to the cylinder tube such that when gas is introduced into said chamber, the gas forms a cushion about at least a portion of the piston upon which the piston floats to facilitate the low friction movement of the piston in the tube without the use of a lubricant.

2. The gas cylinder of claim 1, wherein the piston seal is elastic and flexes in response to changes in gas pressure in one or both chambers, thereby regulating and maintaining desired gas flow and pressure about the cylindrical walls of the piston.

3. The gas cylinder of claim 2, wherein the piston seal is a unitary member having a generally X-shaped cross-section; said piston seal expanding and contracting due to pressure in said chamber.

4. The gas cylinder of claim 2 wherein said piston seal comprises a forward sealing member and a rear sealing member, said members being spaced apart from each other and being sloped at least in part toward each other; said sealing members defining a sealing member angle with the vertical.

5. The gas cylinder of claim 4 wherein said seal is received in a groove in said piston, said groove having a forward wall and a rear wall; said forward and rear walls defining a groove wall angle with the vertical which is less than said sealing member angle.

6. The gas cylinder of claim 5 wherein said spacer is generally trapezoidal in shape; said spacer having side walls defining a spacer angle with the vertical which is greater than said sealing member angle.

7. The gas cylinder of claim 1, wherein said piston comprises a forwardly facing cavity; said rod including an extension extending outwardly from said rod, said extension being received in said piston cavity and said piston being adapted to prevent said extension from exiting said piston cavity; wherein said rod is floatingly contained in said piston cavity and is movable axially in said chamber relative to said piston.

8. The gas cylinder of claim 1 wherein said cylinder includes a bushing in said front end cap opening; said rod extending axially through said bushing; said bushing having at least one axial slit extending the length of the bushing.

9. The gas cylinder of claim 1, wherein at least one of the front end cap and the rear end cap is formed separately from the tube.

10. The gas cylinder of claim 1, wherein at least the tube and piston are composed of a low friction plastic.

11. The gas cylinder of claim 1, wherein at least the tube and piston are composed of a plastic having a molecular weight greater than about 500,000 and a of sliding friction lower than about 0.4.

12. A gas cylinder comprising:
    a housing comprising a tube, a front end cap and a rear end cap defining a chamber; said front end cap including an opening therethrough;
    a piston received in the chamber for axial movement within the chamber;
    a piston seal between said piston and said tube; said piston seal comprising a forward sealing member and a rear sealing member, said members being spaced apart from each other and being sloped at least in part toward each other;
    a rod operatively connected to the piston and extending forwardly from the piston and through said front end cap opening to exit the chamber through the front end cap; and
    one or more gas ports in the housing to allow the input and exhaust of gas in the chamber.

13. The gas cylinder of claim 12, wherein the piston seal is received in a groove in the piston.

14. The gas cylinder of claim 12 wherein said forward sealing member comprises a forward sealing disc and said; rear sealing member comprises a rear sealing disc, said discs being spaced apart from each other; said sealing discs defining a sealing disc angle with the vertical.

15. The gas cylinder of claim 14, wherein the piston seal is received in a groove in the piston.

16. The gas cylinder of claim 15, wherein said groove has a forward wall and a rear wall; said forward and rear walls defining a groove wall angle with a diameter of said chamber which is less than said sealing disc angle.

17. The gas cylinder of claim 14, further comprising a spacing element between the sealing discs, said spacing element having side surfaces which support the sealing discs.

18. The gas cylinder of claim 17, wherein said spacing element is generally trapezoidal in shape; said spacing element having side walls defining a spacer angle with the diameter of said chamber which is greater than said sealing disc angle.

19. The gas cylinder of claim 12, further comprising a rod seal between said rod and said front end cap opening.

20. The gas cylinder of claim 12, wherein the outer edges of one or more of said sealing discs are rounded.

21. The gas cylinder of claim 12, wherein said cylinder includes a bushing in said front end cap opening bore; said rod extending axially through said bushing; said bushing having at least one axial slit extending the length of the bushing.

22. The gas cylinder of claim 12, further comprising a spacing element between the sealing members, said spacing element having side surfaces which support the sealing members.

23. A gas cylinder comprising:
   a housing comprising a tube, a front end cap and a rear end cap defining a chamber; said front end cap including an opening therethrough;
   a piston received in the chamber for axial movement within the chamber;
   a rod operatively connected to the piston and extending forwardly from the piston and through said front end car opening to exit the chamber through the front end cap;
   a rod seal between said rod and said front end cap opening; said rod seal comprising a forward angle portion having an inner leg and an outer leg joined at an apex and a rear angle portion having an inner leg and an outer leg joined at an apex; said rear angle portion being received within the forward angle portion; said rod seal apexes facing forwardly; and
   one or more gas ports in the housing to allow the input and exhaust of gas in the chamber.

24. A gas cylinder apparatus operable at a broad range of temperatures, at least including all temperatures between −60° C. to 110° C., comprising:
   a housing comprising a tube, a front end cap and a rear end cap which in combination define a chamber; said housing including at least one gas port to allow the input and exhaust of gas into the camber;
   a piston axially movable with in the chamber;
   a rod operatively connected to the piston and extending from the piston forwardly through the front end cap of the housing;
   a piston seal about the piston; and
   a rod seal about the rod;
   wherein at least the tube, piston, piston seal, and rod seal are composed of a plastic having a molecular weight greater than about 500,000 and a coefficient of sliding friction lower than about 2.0.

25. The gas cylinder of claim 24 wherein piston, rod, and tube are dimensioned to enable operation of the cylinder without lubrication.

26. The gas cylinder apparatus as in claim 24, wherein all components possess a high chemical resistivity.

27. The gas cylinder of claim 24, wherein the dimensions of the piston seal are configured to facilitate flexing of said seal in response to changes in gas pressure in the chamber, thereby regulating and maintaining desired gas flow and pressure about the cylindrical walls of the piston.

28. The gas cylinder of claim 24, wherein the dimensions of the rod seal are configured to facilitate radial contraction and expansion in response to changes in gas pressure in the chamber nearest the rod, thereby regulating and maintaining desired gas flow and pressure about the cylindrical walls of the rod.

29. A gas cylinder comprising:
   a housing comprising a tube, a front end cap and a rear end cap defining a chamber; said front end cap including an opening therethrough;
   a piston received in the chamber for axial movement within the chamber;
   one or more gas ports in the housing to allow the input and exhaust of gas in the chamber; and
   a rod operatively connected to the piston and extending forwardly from the piston and through said front end cap opening to exit the chamber through the front end cap; said piston comprising a forwardly facing cavity; said rod including an extension extending outwardly from said rod, said extension being received in said piston cavity and said piston being adapted to prevent said extension from exiting said piston cavity;
   wherein said rod is floatingly contained in said piston cavity and is movable axially in said chamber relative to said piston.

30. The gas cylinder of claim 29, further comprising a retainer, said retainer being sized and situated in the piston cavity so as to prevent the extension from exiting the piston cavity.

31. The gas cylinder of claim 29, further comprising a piston seal between said piston and said tube.

32. The gas cylinder of claim 29, wherein said cylinder includes a bushing in said front end cap opening; said rod extending axially through said bushing; said bushing having at least one axial slit extending the length of the bushing.

33. The gas cylinder of claim 29, wherein the rod is radially movable in said chamber relative to said piston.

34. The gas cylinder of claim 29, wherein the rod is pivotally movable in said chamber relative to said piston.

35. A gas cylinder comprising:
   a housing having a tube, a front end cap and a rear end cap which in combination define a chamber; said housing including at least one gas port to allow the input and exhaust of gas into the chamber;
   a piston axially movable with in the chamber; and
   a rod operatively connected to the piston and extending from the piston forwardly through the front end cap of the housing;
   wherein at least the tube and piston are composed of a plastic having a molecular weight greater than about 500,000 and a coefficient of sliding friction lower than about 2.0; said gas cylinder being capable of operating at temperatures below about −10C.

36. The gas cylinder of claim 35, further comprising a piston seal about the piston, said piston seal being composed of a plastic having a molecular weight greater than about 500,000 and a coefficient of sliding friction lower than about 2.0.

37. The gas cylinder of claim 35, further comprising a rod seal between said rod and said front end cap opening, said rod seal being composed of a plastic having a molecular weight greater than about 500,000 and a coefficient of sliding friction lower than about 2.0.

38. The gas cylinder of claim 35, wherein the piston and the tube are configured so as to enable the operation of the gas cylinder without lubrication.

39. A gas cylinder comprising:
   a housing having a tube, a front end cap and a rear end cap which in combination define a chamber; said housing including at least one gas port to allow the input and exhaust of gas into the camber;

a piston axially movable with in the chamber; and a rod operatively connected to the piston and extending from the piston forwardly through the front end cap of the housing;

wherein at least the tube and piston are composed of a plastic having a molecular weight greater than about 500,000 and a coefficient of sliding friction lower than about 2.0; said gas cylinder being capable of operation at more than one temperature within a broad range of temperatures.

40. The gas cylinder of claim 39, further comprising a piston seal about the piston, said piston seal being composed of a plastic having a molecular weight greater than about 500,000 and a coefficient of sliding friction lower than about 2.0.

41. The gas cylinder of claim 39, further comprising a rod seal between said rod and said front end cap opening, said rod seal being composed of a plastic having a molecular weight greater than about 500,000 and a coefficient of sliding friction lower than about 2.0.

42. A gas cylinder comprising:

a housing having a tube, a front end cap and a rear end cap which in combination define a chamber; said housing including at least one gas port to allow the input and exhaust of gas into the chamber;

a piston axially movable with in the chamber; and a rod operatively connected to the piston and extending from the piston forwardly through the front end cap of the housing;

wherein at least the tube and piston are composed of a plastic having a molecular weight greater than about 500,000 and a coefficient of sliding friction lower than about 2.0; said gas cylinder being capable of operation without lubrication while having at least the same durability as that of a conventional gas cylinder.

43. The gas cylinder of claim 42, further comprising a piston seal about the piston, said piston seal being composed of a plastic having a molecular weight greater than about 500,000 and a coefficient of sliding friction lower than about 2.0.

44. The gas cylinder of claim 42, further comprising a rod seal between said rod and said front end cap, said rod seal being composed of a plastic having a molecular weight greater than about 500,000 and a coefficient of sliding friction lower than about 2.0.

* * * * *

UNITED STATES PATENT AND TRADEMARK OFFICE
CERTIFICATE OF CORRECTION

PATENT NO. : 6,691,607 B2
DATED : February 17, 2004
INVENTOR(S) : Vatterott et al.

It is certified that error appears in the above-identified patent and that said Letters Patent is hereby corrected as shown below:

Column 10,
Line 19, replace "have a weight" with -- have a molecular weight --
Line 20, replace "coefficient of than" with -- coefficient of sliding friction less than --
Line 64, replace "inches 3.2" with -- inches, equating to over 3.2 --

Column 11,
Lines 1-2, replace "seal 126" with -- seal retainer 126 --
Line 7, replace "signified" with -- significant --
Line 13, replace "includes" with -- including --

Column 18,
Line 26, replace "and a of" with -- and a coefficient of --
Lines 49-50, replace "said; rear" with -- said rear --

Column 19,
Line 22, replace "car" with -- cap --

Signed and Sealed this

Twenty-ninth Day of June, 2004

JON W. DUDAS
*Acting Director of the United States Patent and Trademark Office*